(12) United States Patent
Krauss et al.

(10) Patent No.: US 12,438,355 B2
(45) Date of Patent: Oct. 7, 2025

(54) OVERVOLTAGE PROTECTION SPARK GAP ASSEMBLY AND METHOD FOR OPERATING AN OVERVOLTAGE PROTECTION SPARK GAP ASSEMBLY

(71) Applicant: DEHN SE, Neumarkt i.d.OPf. (DE)

(72) Inventors: Bernhard Krauss, Berg (DE);
Christian Lang, Greding (DE);
Sebastian Haas, Weigendorf (DE);
Roland Eichenseer, Neumarkt (DE);
Juliane Klose, Georgensgmünd (DE);
Richard Daum, Neumarkt (DE)

(73) Assignee: DEHN SE, Neumarkt i.d.Opf. (DE)

( * ) Notice: Subject to any disclaimer, the term of this patent is extended or adjusted under 35 U.S.C. 154(b) by 130 days.

(21) Appl. No.: 18/579,723

(22) PCT Filed: Jul. 5, 2022

(86) PCT No.: PCT/EP2022/068581
§ 371 (c)(1),
(2) Date: Jan. 16, 2024

(87) PCT Pub. No.: WO2023/006355
PCT Pub. Date: Feb. 2, 2023

(65) Prior Publication Data
US 2024/0305087 A1 Sep. 12, 2024

(30) Foreign Application Priority Data
Jul. 27, 2021 (DE) .......................... 102021208076.6

(51) Int. Cl.
*H02H 3/20* (2006.01)
(52) U.S. Cl.
CPC ................................. *H02H 3/205* (2013.01)

(58) Field of Classification Search
CPC .......... H02H 3/205; H02H 9/042; H02H 9/06; H01T 1/14; H01T 2/02; H01T 4/06; H01T 4/12; H01T 4/14; H01T 15/00
(Continued)

(56) References Cited

U.S. PATENT DOCUMENTS

| 9,083,153 B2 | 7/2015 | Ehrhardt et al. |
| 11,705,724 B2 | 7/2023 | Ehrhardt et al. ............... 361/104 |

(Continued)

FOREIGN PATENT DOCUMENTS

| DE | 102005024658 B4 | 2/2007 | ............... H01T 1/10 |
| DE | 102008049458 A1 | 4/2009 | ............... H01T 1/02 |

(Continued)

OTHER PUBLICATIONS

Machine translation of Ehrhardt et al. International Patent Document WO 2009/050148 A1 Apr. 2009 (Year: 2009).*
(Continued)

*Primary Examiner* — Kevin J Comber
(74) *Attorney, Agent, or Firm* — Bodner & Bodner, PLLC; Christian P. Bodner; Gerald T. Bodner

(57) ABSTRACT

An overvoltage protection spark gap assembly includes a first overvoltage protection spark gap (1) which has a first main terminal (1a) and a second main terminal (1b); and a second overvoltage protection spark gap (1') which has a third main terminal (1a') and a fourth main terminal (1b'). The second main terminal (1b) and the third main terminal (1a') are electrically connected together. A first electrically conductive probe device (K2) is introduced into a wear part (38) of the first overvoltage protection spark gap (1) such that, in the event of a specific degree of wear, the first electrically conductive probe device (K2) comes electrically into contact with an arc (41) in the first overvoltage protection spark gap (1). The second overvoltage protection spark
(Continued)

gap (1') has a second electrically conductive probe device (33) which comes electrically into contact with an arc in the second overvoltage protection spark gap (1').

13 Claims, 5 Drawing Sheets

(58) Field of Classification Search
USPC .......................................... 361/91.1
See application file for complete search history.

(56) References Cited

U.S. PATENT DOCUMENTS

| 11,749,481 | B2 | 9/2023 | Ehrhardt et al. ............... 361/137 |
| 11,764,570 | B2 | 9/2023 | Ehrhardt et al. ............... 361/126 |

FOREIGN PATENT DOCUMENTS

| DE | 102011051738 A1 | 2/2012 | ............... H01T 1/08 |
| DE | 102019210234 B3 | 10/2020 | ............ H01H 85/44 |
| DE | 102019210236 A1 | 11/2020 | ............ H01H 85/44 |
| WO | WO2006128761 A1 | 12/2006 | ............... H01T 2/02 |
| WO | WO-2009050148 A1 * | 4/2009 | ............... H01T 4/16 |
| WO | WO2009050152 A1 | 4/2009 | ............... H01T 4/16 |
| WO | WO-2015028436 A1 * | 3/2015 | ............ H01T 21/00 |
| WO | WO-2020148000 A1 * | 7/2020 | ............ B60S 3/041 |

OTHER PUBLICATIONS

Machine translation of Durth et al. International Patent Document WO 2015/028436 A1 Mar. 2015 (Year: 2015).*
Machine translation of Ehrhardt et al. International Patent Document WO 2020/148000 A1 Jul. 2020 (Year: 2020).*
The Notification Concerning Transmittal of International Preliminary Report on Patentability (Chapter I of the Patent Cooperation Treaty), in English, dated Feb. 8, 2024, which was issued by the International Bureau of WIPO in Applicant's corresponding international PCT application having Serial No. PCT/EP2022/068581, filed on Jul. 5, 2022.
The English translation of the International Preliminary Report on Patentability (Chapter I of the Patent Cooperation Treaty), dated Jan. 18, 2024, which was issued by the International Bureau of WIPO in Applicant's corresponding international PCT application having Serial No. PCT/EP2022/068581, filed on Jul. 5, 2022.
The Written Opinion of the International Searching Authority, in English, dated Nov. 4, 2022, which was issued by the International Bureau of WIPO in Applicant's corresponding international PCT application having Serial No. PCT/EP2022/068581, filed on Jul. 5, 2022.
The International Search Report, in English, dated Nov. 4, 2022, which was issued by the International Bureau of WIPO in Applicant's corresponding international PCT application having Serial No. PCT/EP2022/068581, filed on Jul. 5, 2022.
An Office Action (in German), dated Mar. 15, 2022, issued by the German Patent Office for Applicant's corresponding German Patent Application No. DE102021208076.6, filed Jul. 27, 2021.

* cited by examiner

OVERVOLTAGE PROTECTION SPARK GAP ASSEMBLY AND METHOD FOR OPERATING AN OVERVOLTAGE PROTECTION SPARK GAP ASSEMBLY

The present invention relates to an overvoltage protection spark gap assembly and a method for operating an overvoltage protection spark gap assembly.

PRIOR ART

An overvoltage protection spark gap which utilises the hard gas principle for producing a high pressure for avoiding or quenching follow currents is known from DE 10 2005 024 658 B4. For example, POM (polyoxymethylene) is used as a hard gas-emitting material. Such overvoltage protection spark gaps are subjected to wear under arc loads. If the wear of the hard gas-emitting material exceeds a certain limit, the ability to quench the follow current decreases.

DE 10 2011 051 738 A1 discloses an overvoltage protection spark gap with diverging electrodes, wherein the distance between the opposite electrode surfaces is kept narrow in the ignition region and widens in the running region. Therefore, the pulse current load is limited substantially to the ignition region, while the mains follow currents run along the diverging electrodes in the running region and the mains follow current-arc is divided and quenched in a quenching chamber.

WO 2015/028436 A1 describes a spark gap with an ageing detector, wherein the spark gap has a first discharge electrode and a second discharge electrode which is spaced apart therefrom and between which an arc discharge is formed along the discharge gap between the first discharge electrode and the second discharge electrode when a specific voltage is reached. The discharge gap is surrounded at least in sections by an electrically isolating material, wherein the electrically isolating material has an electrically conductive portion at least one point, wherein the electrically conductive portion is damaged by the effect of arc discharges and the ageing of the spark gap can be determined by measuring the flow rate or the resistance or the capacitance of the electrically conductive portion.

A (safety) fuse is typically connected as a separate component upstream of a spark gap as an SPD (Surge Protection Device) and can interrupt the mains follow current if the SPD fails or is worn. The (safety) fuse and the SPD can be accommodated in the same housing. This results in the following disadvantages:

(1) in order to guarantee a corresponding discharge capacity (8/20, 10/350), the (safety) fuse located upstream must be selected to be correspondingly large which, in the event of a fault, gives rise to large mains follow currents and thus a high load on the system.

(2) if the consumed SPD represents a certain impedance and limits the current a little, it is possible that the (safety) fuse connected upstream trips in a (greatly) delayed manner, which can lead to high thermal stressing of the installed parts. In addition, a charge eliminator can age in such a way that it limits the mains follow current, but cannot quench it. In this case, there can be a high thermal load of the entire current path.

(3) the dimensioning of the conductor cross-sections must be configured for high currents corresponding to the loads stated in (1) and (2).

DISCLOSURE OF THE INVENTION

The present invention provides an overvoltage protection spark gap assembly as claimed in claim 1 and a method for operating an overvoltage protection spark gap assembly as claimed in claim 11.

Preferred developments are described in the respective dependent claims.

Advantages of the Invention

The core of the invention is the monitoring of the reduction in the functional capability of overvoltage protection spark gaps, e.g. by reason of ageing or overloading, for timely disconnection, e.g. by triggering a safety fuse device or a mechanical switch device.

The idea of the present invention is that of detecting a specific degree of wear of the first overvoltage protection spark gap by means of a first electrically conductive probe device which is introduced into a wear part of the first overvoltage protection spark gap in such a way that, with the specific degree of wear, the first electrically conductive probe device comes electrically into contact with an arc in the first overvoltage protection spark gap, as a first criterion; detecting an entry of an arc into the second overvoltage protection spark gap by means of a second electrically conductive probe device which comes electrically into contact with an arc in the second overvoltage protection spark gap, as a second criterion; and disconnecting the first terminal contact from the first main terminal and/or disconnecting the second terminal contact from the fourth main terminal if both of the first and second criteria are met.

According to a preferred embodiment, the first overvoltage protection spark gap has a hard gas-emitting material as a wear part in at least one region, into which material the first electrically conductive probe device is inserted in such a way that it is located at a fixed distance from an arc region of the associated arc chamber, encased within the region. This allows the wear of a hard gas-emitting overvoltage protection spark gap to be monitored in a reliable manner.

According to a further preferred embodiment, the first overvoltage protection spark gap has an, in particular electrically conductive, hard gas-emitting material as a wear part in at least one region, in the proximity of which material the first electrically conductive probe device is inserted in such a way that it is located at a fixed distance from an arc region of the associated arc chamber outside the region.

According to a further preferred embodiment, the first overvoltage protection spark gap has an electrically isolating material as a wear part in at least one region, into which material the first electrically conductive probe device is inserted in such a way that it is located at a fixed distance from an arc region of the associated arc chamber, encased within the region. This allows the wear of any overvoltage protection spark gap with an isolator region to be monitored in a reliable manner.

According to a further preferred embodiment, the second overvoltage protection spark gap has a first and a second diverging electrode which terminate in a quenching chamber which has a plurality of quenching plates arranged in parallel, and wherein the second electrically conductive probe device is arranged between two adjacent quenching plates or is electrically connected to a quenching plate.

According to a further preferred embodiment, the second overvoltage protection spark gap has a hard gas-emitting material in at least one region, into which material the second electrically conductive probe device is inserted in such a way that it is located in an arc region of the associated arc chamber.

According to a further preferred embodiment, the second overvoltage protection spark gap has an arc chamber surrounded by an isolator region, into which arc chamber the second conductive probe device is inserted through the isolator region.

According to a further preferred embodiment, the disconnecting device has a safety fuse device which can be triggered by the activation signal and is connected between the first main terminal and the first terminal contact.

According to a further preferred embodiment, the disconnecting device has a mechanical switch device which is connected between the first main terminal and the first terminal contact.

According to a further preferred embodiment, the activation device has a current-limiting resistor and an indicator fuse which are connected in series in the current path between the first electrically conductive probe device and the second electrically conductive probe device.

BRIEF DESCRIPTION OF THE DRAWINGS

In the drawings.

In the figures, like or functionally identical elements are designated by the same reference signs.

DESCRIPTION OF THE EXEMPLIFIED EMBODIMENTS

Figure 1:
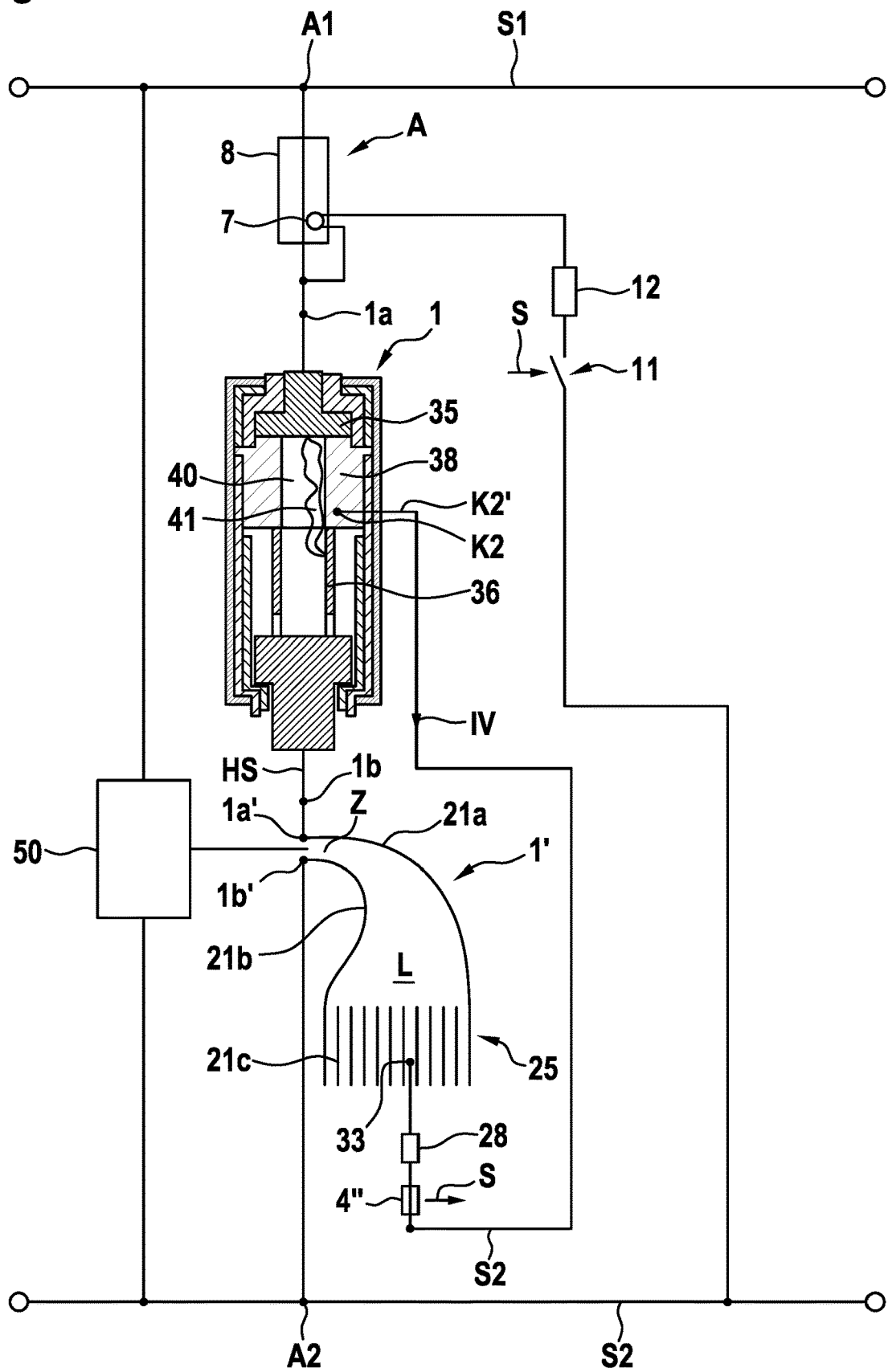
FIG. 1 shows a circuit diagram to exemplify an overvoltage protection spark gap assembly according to a first embodiment of the present invention.

FIG. 1 shows a circuit diagram to exemplify an overvoltage protection spark gap assembly according to a first embodiment of the present invention.

In FIG. 1, reference sign 1 designates a first overvoltage protection spark gap which has a first main terminal 1a and a second main terminal 1b. Reference sign 1' designates a second overvoltage protection spark gap which has a third main terminal 1a' and a fourth main terminal 1b'.

The first main terminal 1a can be connected to a first voltage line S1 of a supply network via a first terminal contact A1 and the fourth main terminal 1b' can be connected to a second voltage line S2 of the supply network via a second terminal contact A2.

The second main terminal 1b and the third main terminal 1a' are electrically connected to one another such that the first overvoltage protection spark gap 1 and the second overvoltage protection spark gap 1' are connected in series.

In the case of this exemplified embodiment, the second overvoltage protection spark gap 1' can be triggered via a trigger device 50 which is connected between the first and second voltage lines S1, S2.

A safety fuse device 8 which can be triggered by a bridge igniter 7 is connected between the first main terminal 1a and the first terminal contact A1. In this example, the inherent safety function of the safety fuse device 8 serves to disconnect the spark gap assembly in the event of wear or ageing, as will be described later.

On the one hand, the bridge igniter 7 is connected to the first main terminal 1a and, on the other hand, can be connected to the second voltage line S2 via a current-limiting resistor 12 and a switch device 11 which can be controlled by an activation signal S.

The components 7, 8, 11, 12 thus form a disconnecting device A for disconnecting the first terminal contact A1 from the first main terminal 1a.

The first overvoltage protection spark gap 1 corresponds in principle to the overvoltage protection spark gap with hard gas quenching as known from DE 10 2005 024 658 B4. In addition, the first overvoltage-spark gap 1 has a first electrically conductive probe device K2 which is introduced into an electrically isolating wear part 38 of the first overvoltage protection spark gap 1 such that, in the event of a specific degree of wear, the first electrically conductive probe device K2 comes electrically into contact with an arc 41 in the arc chamber 40 between the main electrodes 35, 36 of the first overvoltage protection spark gap 1. Externally, the first probe device K2 is connected via a terminal line K2'.

The first overvoltage protection spark gap 1 has, as a wear part 38 in at least one region, a hard gas-emitting material which ages when loaded with an arc as a result of arc burn-off. The region 38 can consist e.g. of POM (polyoxymethylene). The first electrically conductive probe device K2, e.g. a wire or an electrically conductive strip, is initially inserted into the region 38 such that it is located at a fixed distance from the arc region 41 of the arc chamber 40 within the region 38 and is arranged in a sandwich structure of the region 38, encased by the hard gas-emitting material.

When the hard gas-emitting material in the region 38 is burnt off by the arc 41 up to the first electrically conductive probe device K2, the latter comes electrically into contact with an arc 41 in the first overvoltage protection spark gap 1 and taps its potential.

The second overvoltage protection spark gap 1' is e.g. a horn gap, as is known from DE 10 2011 051 738 A1. In particular, the second overvoltage protection spark gap 1' has a first and a second diverging electrode 21a, 21b. In an ignition region Z, the distance between the first and second diverging electrode 21a, 21b is kept small, whereas the distance between the first and second diverging electrode 21a, 21b becomes increasingly wider in a running region L. The first and second diverging electrode 21a, 21b terminate in a quenching chamber 25 which has a plurality of quenching plates 21c arranged in parallel.

In other embodiments (not illustrated), the electrodes or baffle plates can even terminate some distance below the quenching chamber. The arc then quasi bridges the distance to the quenching chamber by expansion thereof.

The second overvoltage protection spark gap 1' has a second electrically conductive probe device 33, e.g. likewise a wire or an electrically conductive strip which comes electrically into contact with an arc in the second overvoltage protection spark gap 1'. In the present example, the second electrically conductive probe device 33 is arranged between two adjacent quenching plates 21c.

The first electrically conductive probe device K2 and the second electrically conductive probe device 33 are electrically connected to one another via an activation device 28; 4" which, in the present case, has a current-limiting resistor 28 and an indicator fuse 4".

The activation device 28, 4" is configured to detect a flow of current or a corresponding portion of the flow of current in the current path IV between the first electrically conductive probe device K2 and the second electrically conductive probe device 33 in the event of wear of the region 38 of the first overvoltage protection spark gap 1.

The activation device 28; 4" is configured such that the indicator fuse 4" outputs the activation signal S in order to activate the disconnecting device A if the detected flow of current or the corresponding portion of the flow of current meets a specified criterion.

All of the components illustrated in FIG. 1 are located preferably in plug-in part of a two-part apparatus (not illustrated). The two parts consist of the base part (mounting, terminal contacting, etc.) and plug-in part (spark gaps).

The object of the second overvoltage spark gap 1' is primarily to limit and interrupt the mains follow current in the event of "ageing/wear". This behaviour corresponds to an essential function of fuses connected upstream in the case of prior art installations. If such an event occurs, this is detected by means of the activation device 28, 4" and an activation signal (electrical, mechanical, ... ) A is sent to the effect chain located downstream. This effect chain ultimately implements galvanic separation with corresponding dielectric strength between the base part and the plug-in part. As a result, the spark gap assembly is disconnected from the supply network. The described mode of operation is achieved by the characteristic, time-related coordination between the different spark gap technologies.

On the one hand, the technology overcomes the disadvantageous aspects of the prior art described in the introduction and, on the other hand, requires less space, time and individual components for installation. This also reduces the probability of faults in the installation.

During regular operation, the series connection of the first and second overvoltage protection spark gaps 1, 1' is set to a conductive state by the trigger device 50 in the event of an overvoltage event. The first overvoltage protection spark gap 1 limits the mains follow current and quenches before the arc can enter the quenching chamber 25. The current path IV remains inactive.

If the first overvoltage protection spark gap 1 now reaches the wear limit, it can no longer limit the mains follow current, the predetermined breaking point in the region 38 is activated and the first probe device K2 reaches electrical potential from the arc 41.

However, since the mains follow current continues to flow/increase, the arc now runs into the quenching chamber 25 of the second overvoltage protection spark gap 1'. As a result, the mains follow current is limited/quenched in this case. This is accompanied by the activation of the probe current path IV. The "path" via the probe current path IV is initially the most attractive for the current/arc, so that in any event it commutates at least partially and activates the activation device 28, 4", so that the disconnecting device A is activated.

Figure 2:
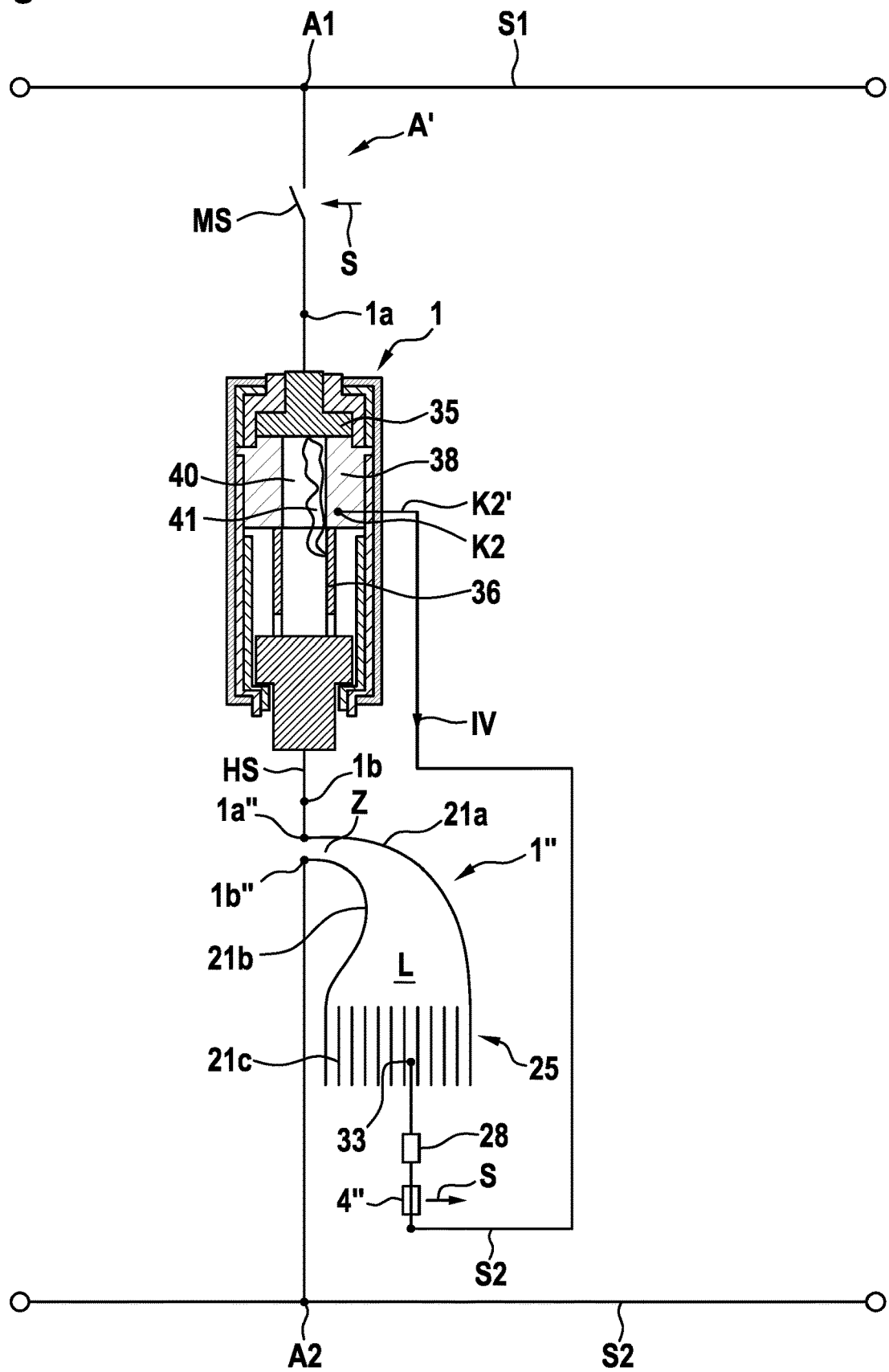
FIG. 2 shows a circuit diagram to exemplify an overvoltage protection spark gap assembly according to a second embodiment of the present invention.

FIG. 2 is a circuit diagram to exemplify an overvoltage protection spark gap assembly according to a second embodiment of the present invention.

The second embodiment differs from the first embodiment in that the second overvoltage protection spark gap 1" having the first and second main terminal 1a", 1b" has no triggering. By means of suitable dimensioning, it is possible to dispense with the trigger device 50 and so the number of components is further reduced.

In addition, in the second embodiment, the activation signal S acts directly on a mechanical switch device MS, which is connected between the first main terminal 1a and the first terminal contact A1 as a disconnecting device A' instead of the safety fuse device 8.

Otherwise, the second embodiment is constructed in a similar manner to the first embodiment.

Figure 3:
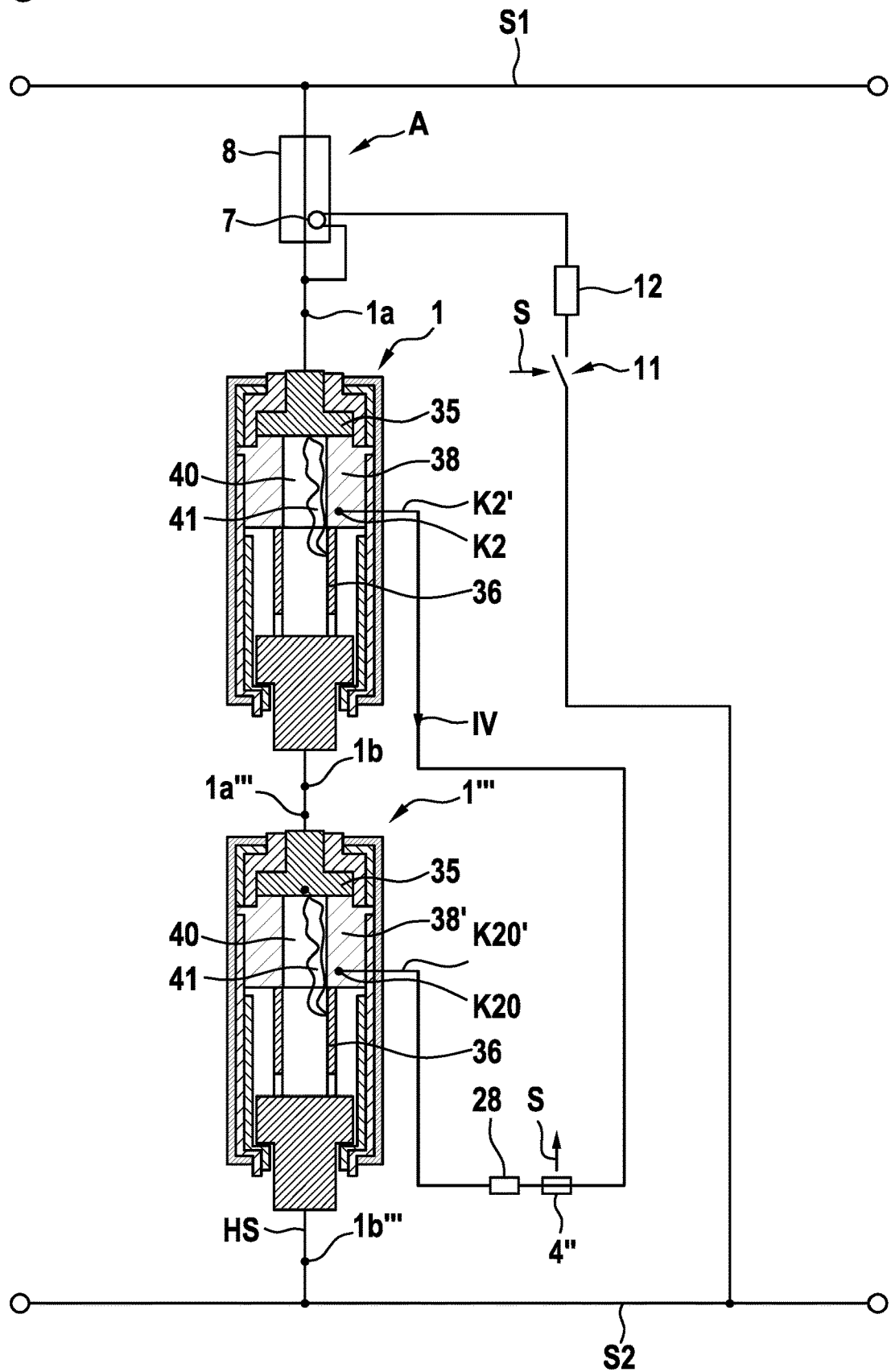
FIG. 3 shows a circuit diagram to exemplify an overvoltage protection spark gap assembly according to a third embodiment of the present invention.

FIG. 3 is a circuit diagram to exemplify an overvoltage protection spark gap assembly according to a third embodiment of the present invention.

The third embodiment differs from the first embodiment in that the second overvoltage protection spark gap 1'" having the first and second main terminal 1a'", 1b'" has no horn gap but instead likewise has an overvoltage protection spark gap with hard gas quenching.

The second overvoltage-spark gap 1'" has a second electrically conductive probe device K20 which is introduced into an electrically isolating wear part 38', e.g. consisting of POM, of the second overvoltage protection spark gap 1'" such that it comes electrically into contact with an arc 41 in the arc chamber 40 between the main electrodes 35, 36 of the second overvoltage protection spark gap 1'". Externally, the second probe device K20 is connected via a terminal line K20'. The second electrically conductive probe device K20 is introduced so deeply into the region 38' that it is always reached by the potential of the arc 41 in order in this way to be able to reliably produce the AND link of the ageing of the first overvoltage protection spark gap 1 and the entry of the arc 41 into the second overvoltage protection spark gap. Otherwise, the structure of the second electrically conductive probe device K20 corresponds to the structure of the first probe device K2.

In the case of this third embodiment, the current path IV extends from the first probe device K2 via the activation device 28, 4" to the second probe device K20.

Otherwise, the third embodiment is constructed in a similar manner to the first embodiment.

Figure 4:
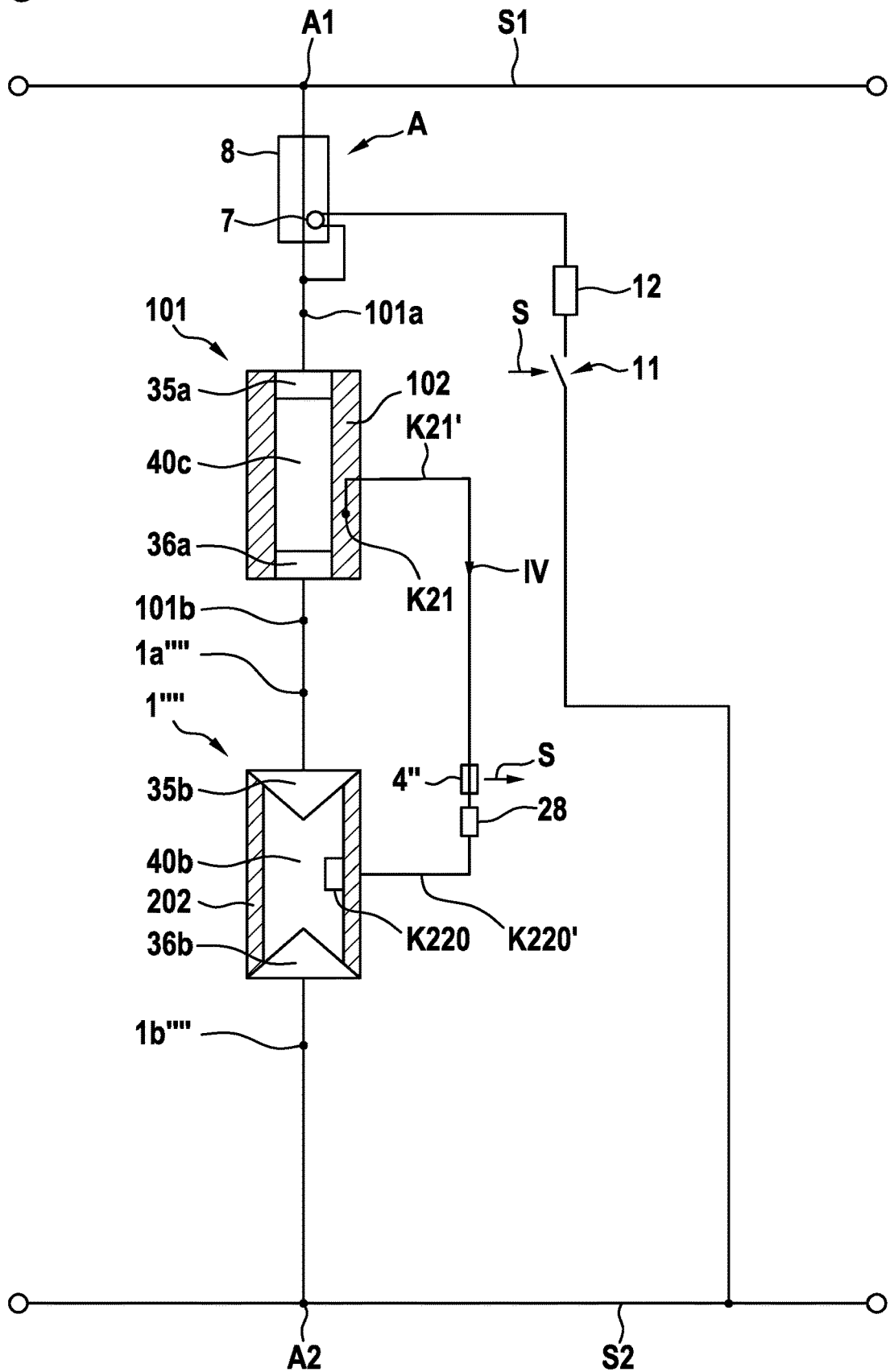
FIG. 4 shows a circuit diagram to exemplify an overvoltage protection spark gap assembly according to a fourth embodiment of the present invention.

FIG. 4 is a circuit diagram to exemplify an overvoltage protection spark gap assembly according to a fourth embodiment of the present invention.

The fourth embodiment differs from the first embodiment in that the first overvoltage protection spark gap 101 having the first and second main terminals 101a, 101b does not have a hard gas-emitting region but instead has an arc chamber 40a which is surrounded by an isolator region 102 and is located between the first and second main electrode 35a, 36a.

A first electrically conductive probe device K21 which is connected externally to the current path IV via a terminal line K21' is introduced into the isolator region 102 which is subjected to wear in a similar manner to the hard gas-emitting region 38.

The second overvoltage protection spark gap 1"" having the first and second main terminal 1a"" 1b"" likewise has an arc chamber 40b which is surrounded by an isolator region 202 and is located between the first and second main electrode 35b, 36b.

A second conductive probe device K220 which is connected externally to the current path IV via a terminal line K220' is introduced into the arc chamber 40b. Therefore, the second conductive probe device K220 regularly detects entry of the arc into the arc chamber 40b.

Otherwise, the fourth embodiment is constructed in a similar manner to the first embodiment.

Figure 5:
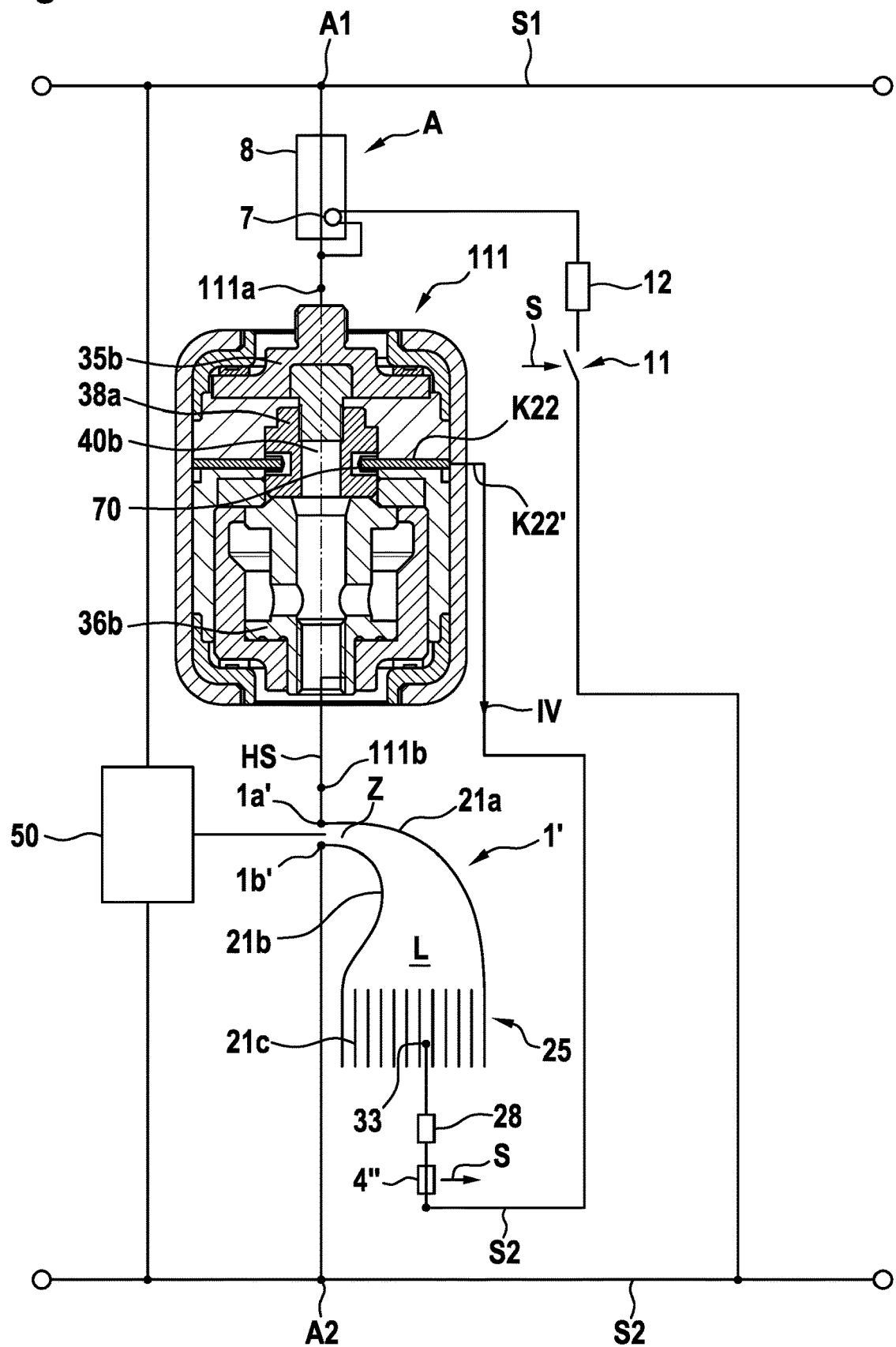
FIG. 5 shows a circuit diagram to exemplify an overvoltage protection spark gap assembly according to a fourth embodiment of the present invention.

FIG. 5 is a circuit diagram to exemplify an overvoltage protection spark gap assembly according to a fourth embodiment of the present invention.

The fifth embodiment differs from the first embodiment in that the first overvoltage protection spark gap 111 having the first and second main terminal 111a, 111b has a conductive, hard gas-emitting region 38a which ages when loaded with an arc as a result of arc burn-off. The region 38a can consist e.g. of B-POM (black polyoxymethylene). The conductive, hard gas-emitting region 38a surrounds the arc chamber 40b which is located between the first and second main electrode 35b, 36b.

A first annular, electrically conductive probe device K22 which is connected externally to the current path IV via a terminal line K22' is introduced through an air gap 70 in a spaced-apart manner into, or in the vicinity adjacent to, the conductive, hard gas-emitting region 38a which is subjected to wear.

If the first overvoltage protection spark gap 111 now reaches the wear limit and the conductive hard gas-emitting region 38a has burnt off, it can no longer limit the mains follow current and the first probe device K22 reaches electrical potential of the arc.

Otherwise, the fifth embodiment is constructed in a similar manner to the first embodiment.

Although the present invention has been described in full above with the aid of preferred exemplified embodiments, it is not limited thereto but can be modified in diverse ways.

In particular, the invention is not restricted to the illustrated activation device which mechanically activates the effect chain—located downstream—to the disconnecting device, but instead can also be implemented e.g. in a purely electronic manner.

The second electrically conductive probe device does not have to be arranged between two adjacent quenching plates, but instead can also be electrically connected to a quenching plate.

In the case of an isolating, hard gas-emitting material, the first electrically conductive probe device can also be inserted in the vicinity thereof so that, in the event of a specific degree of wear, said probe device is reached by the arc of the first overvoltage protection spark gap.

The invention claimed is:

1. Overvoltage protection spark gap assembly, having:
    a first overvoltage protection spark gap (1; 101; 111) which has a first main terminal (1a; 101a; 111a) and a second main terminal (1b; 101b; 111b), and a second overvoltage protection spark gap (1'; 1"; 1'"; 1"" ") which has a third main terminal (1a'; 1a"; 1a'"; 1a" ") and a fourth main terminal (1b'; 1b"; 1b'"; 1b" ");
    wherein the first main terminal (1a; 101a; 111a) is connectable to a first voltage line (S1) of a supply network via a first terminal contact (A1) and the fourth main terminal (1b'; 1b"; 1b'"; 1b" ") is connectable to a second voltage line (S2) of the supply network via a second terminal contact (A2);
    wherein the second main terminal (1b; 101b; 111b) and the third main terminal (1a'; 1a"; 1a'"; 1a" ") are electrically connected to one another such that the first overvoltage protection spark gap (1; 101; 111) and the second overvoltage protection spark gap (1'; 1"; 1'" ; 1" ") are connected in series;
    wherein the first overvoltage protection spark gap (1; 101; 111) has a first electrically conductive probe device (K2; K21; K22) which is introduced into, or in the vicinity of, a wear part (38; 102; 38a) of the first overvoltage protection spark gap (1; 101; 111) such that, in the event of a specific degree of wear, the first electrically conductive probe device (K2; K21; K22) comes electrically into contact with an arc (41) in the first overvoltage protection spark gap (1; 101; 111), and wherein the second overvoltage protection spark gap (1'; 1"; 1'"; 1" ") has a second electrically conductive probe device (33; K20; K220) which comes electrically into contact with an arc in the second overvoltage protection spark gap (1'; 1"; 1'"; 1" ");
    wherein the first electrically conductive probe device (K2; K21; K22) and the second electrically conductive probe device (33; K20; K220) are electrically connected to one another via an activation device (28; 4") which is designed to detect a flow of current or a corresponding portion of the flow of current in the current path (IV) between the first electrically conductive probe device (K2; K21; K22) and the second electrically conductive probe device (33; K20; K220);
    a disconnecting device (A; 7, 8, 11, 12; A'; MS) for disconnecting the first terminal contact (A1) from the first main terminal (1a; 101a; 111a) and/or for disconnecting the second terminal contact (A2) from the fourth main terminal (1b'; 1b"; 1b'"; 1b" ");
    wherein the activation device (28; 4") is configured such that it outputs an activation signal(S) in order to activate the disconnecting device (A; 7, 8, 11, 12) if the detected flow of current or the corresponding portion of the flow of current satisfies a specified criterion.

2. Overvoltage protection spark gap assembly as claimed in claim 1, wherein the first overvoltage protection spark gap (1) has an electrically isolating, hard gas-emitting material as a wear part (38) in at least one region, into which material the first electrically conductive probe device (K2) is inserted in such a way that it is located at a fixed distance from an arc region (41) of the associated arc chamber (40), encased within the region.

3. Overvoltage protection spark gap assembly as claimed in claim 1, wherein the first overvoltage protection spark gap (1; 111) has an electrically conductive, hard gas-emitting material as a wear part (38a) in at least one region, in the proximity of which material the first electrically conductive probe device (K22) is inserted in such a way that it is located at a fixed distance from an arc region of the associated arc chamber (40b) outside the region.

4. Overvoltage protection spark gap assembly as claimed in claim 1, wherein the first overvoltage protection spark gap (101) has an electrically isolating material as a wear part (102) in at least one region, into which material the first electrically conductive probe device (K21) is inserted in such a way that it is located at a fixed distance from an arc region of the associated arc chamber (40a), encased within the region.

5. Overvoltage protection spark gap assembly as claimed in claim 1, wherein the second overvoltage protection spark gap (1'; 1") has a first and a second diverging electrode (21a, 21b) which terminate in a quenching chamber (25) which has a plurality of quenching plates (21c) arranged in parallel, and wherein the second electrically conductive probe device (33) is arranged between two adjacent quenching plates (21c) or is electrically connected to a quenching plate (21c).

6. Overvoltage protection spark gap assembly as claimed in claim 1, wherein the second overvoltage protection spark gap (1'"") has a hard gas-emitting material (38') in at least one region, into which material the second electrically conductive probe device (K20) is inserted in such a way that it is located in an arc region (41) of the associated arc chamber (40).

7. Overvoltage protection spark gap assembly as claimed in claim 1, wherein the second overvoltage protection spark gap (1'' ''') comprises an arc chamber (40b) which is surrounded by an insulator region (202) and into which the second conductive probe device (K22) is introduced through the isolator region (202).

8. Overvoltage protection spark gap assembly as claimed in claim 1, wherein the disconnecting device (A) has a safety fuse device (8) which is triggerable by the activation signal (S) and is connected between the first main terminal (1a; 101a; 111a) and the first terminal contact (A1).

9. Overvoltage protection spark gap assembly as claimed in claim 1, wherein the disconnecting device (A') has a mechanical switch device (MS) which is connected between the first main terminal (la; 101a) and the first terminal contact (A1).

10. Overvoltage protection spark gap assembly as claimed in claim 1, wherein the activation device (28; 4'') has a current-limiting resistor (28) and an indicator fuse (4'') which are connected in series in the current path (IV) between the first electrically conductive probe device (K2; K21) and the second electrically conductive probe device (33; K20; K220).

11. Method for operating an overvoltage protection spark gap assembly, having:
- a first overvoltage protection spark gap (1; 101; 111) which has a first main terminal (1a; 101a; 111a) and a second main terminal (1b; 101b; 111b);
- a second overvoltage protection spark gap (1'; 1''; 1'''; 1'' ''') which has a third main terminal (1a'; 1a''; 1a'''; 1a'' ''') and a fourth main terminal (1b'; 1b''; 1b'''; 1b'' ''');
- wherein the first main terminal (1a; 101a; 111a) is connectable to a first voltage line (S1) of a supply network via a first terminal contact (A1) and the fourth main terminal (1b'; 1b''; 1b'''; 1b'' ''') is connectable to a second voltage line (S2) of the supply network via a second terminal contact (A2);
- wherein the second main terminal (1b; 101b; 111b) and the third main terminal (1a'; 1a''; 1a'''; 1a'' ''') are electrically connected to one another such that the first overvoltage protection spark gap (1; 101; 111) and the second overvoltage protection spark gap (1'; 1''; 1''; 1'' ''') are connected in series;
- wherein the method includes the steps of:
- detecting a specific degree of wear of the first overvoltage protection spark gap (1; 101; 111) by means of a first electrically conductive probe device (K2; K21; K22) which is introduced into, or in the vicinity of, a wear part (38; 102; 38a) of the first overvoltage protection spark gap (1; 101; 111) such that, in the event of a specific degree of wear, the first electrically conductive probe device (K2; K21; K22) comes electrically into contact with an arc (41) in the first overvoltage protection spark gap (1; 101; 111), as a first criterion;
- detecting entry of an arc into the second overvoltage protection spark gap (1'; 1''; 1'''; 1'' ''') by means of a second electrically conductive probe device (33; K20; K220) which comes electrically into contact with an arc in the second overvoltage protection spark gap (1'; 1''; 1'''; 1'' '''), as a second criterion;
- disconnecting the first terminal contact (A1) from the first main terminal (1a; 101a) and/or disconnecting the second terminal contact (A2) from the fourth main terminal (1b'; 1b''; 1b'''; 1b'' ''') if both of the first criterion and second criterion are met.

12. Method as claimed in claim 11, wherein the first electrically conductive probe device (K2; K21; K22) and the second electrically conductive probe device (33; K20; K220) are arranged in a common current path (IV), further comprising the steps of:
- detecting a flow of current or corresponding portion of the flow of current in the current path IV); and
- actuating an activation device (28; 4'') which is configured such that it outputs an activation signal(S) in order to activate the disconnecting device (A; 7, 8, 11, 12) based upon the detected flow of current or upon the corresponding portion of the flow of current in the current path (IV).

13. Method as claimed in claim 11, wherein the activation device (28; 4'') activates a mechanical and/or electrical effect chain.

\* \* \* \* \*